(12) United States Patent
Artmann et al.

(10) Patent No.: US 12,316,162 B2
(45) Date of Patent: May 27, 2025

(54) CONNECTION OF A ROTOR SHAFT TO A LAMINATED CORE

(71) Applicant: Hilti Aktiengesellschaft, Schaan (LI)

(72) Inventors: Konrad Artmann, Schondorf (DE); Lothar Dietl, Kaufering (DE); Tobias Schmid, Emmenhausen (DE); Helmut Burger, Unterdiessen (DE)

(73) Assignee: Hilti Aktiengesellschaft, Schaan (LI)

( * ) Notice: Subject to any disclaimer, the term of this patent is extended or adjusted under 35 U.S.C. 154(b) by 164 days.

(21) Appl. No.: 17/778,547

(22) PCT Filed: Nov. 24, 2020

(86) PCT No.: PCT/EP2020/083160
§ 371 (c)(1),
(2) Date: May 20, 2022

(87) PCT Pub. No.: WO2021/110471
PCT Pub. Date: Jun. 10, 2021

(65) Prior Publication Data
US 2023/0041078 A1    Feb. 9, 2023

(30) Foreign Application Priority Data
Dec. 4, 2019 (EP) .................... 19213514

(51) Int. Cl.
*H02K 1/28* (2006.01)
*H02K 1/14* (2006.01)
*H02K 7/00* (2006.01)

(52) U.S. Cl.
CPC ............. *H02K 1/148* (2013.01); *H02K 1/28* (2013.01); *H02K 7/003* (2013.01)

(58) Field of Classification Search
CPC ........ H02K 1/28; H02K 1/2773; H02K 1/246; H02K 1/30; H02K 1/276; H02K 1/32;
(Continued)

(56) References Cited

U.S. PATENT DOCUMENTS

| 5,986,366 | A | 11/1999 | Bailey et al. |
| 7,709,991 | B2 * | 5/2010 | Ionel ........................ H02K 1/28 310/43 |

(Continued)

FOREIGN PATENT DOCUMENTS

| DE | 4432356 A1 | 3/1996 |
| DE | 10342694 A1 | 4/2005 |

(Continued)

OTHER PUBLICATIONS

English Translation DE 102007000213 (Year: 2008).*
English Translation DE-102007029738 (Year: 2009).*
International Search Report of PCT/EP2020/083160, Jan. 18, 2021.

*Primary Examiner* — Bryan R Perez
(74) *Attorney, Agent, or Firm* — Davidson Kappel LLC (57) ABSTRACT

Rotor for an electric motor, having a rotor shaft and, mounted on the rotor shaft, a rotor core having a number of core laminations arranged along an axis of the rotor core. Each core lamination includes a central contoured aperture which is traversed by the rotor shaft and which includes at least two radially extending elevations and at least two cutouts positioned between the elevations, wherein, to form a press fit of the core laminations on the rotor shaft, a distance between the free ends of the elevations is less than a diameter of the rotor shaft, and wherein a duct extending peripherally on the rotor shaft is formed by the respective cutout in the successively arranged core laminations.

15 Claims, 6 Drawing Sheets

(58) Field of Classification Search
CPC ........ H02K 1/148; H02K 1/27; H02K 1/2766; H02K 1/02; H02K 1/16; H02K 1/2753; H02K 1/278
See application file for complete search history.

(56) References Cited

U.S. PATENT DOCUMENTS

| | | | |
|---|---|---|---|
| 8,740,584 B2 * | 6/2014 | Yoshino | F04C 23/02 310/60 A |
| 10,348,145 B2 * | 7/2019 | Yabe | H02K 17/165 |
| 2008/0252165 A1 | 10/2008 | Riedl et al. | |
| 2012/0014823 A1 | 1/2012 | Riedl | |
| 2019/0024650 A1 * | 1/2019 | Lee | F04C 29/023 |

FOREIGN PATENT DOCUMENTS

| | | | | |
|---|---|---|---|---|
| DE | 102007000213 A1 * | 10/2008 | ........... | H02K 1/2773 |
| DE | 102007029738 A1 * | 1/2009 | ........... | H02K 1/2733 |
| DE | 102010031399 A1 | 1/2012 | | |
| DE | 102013021932 A1 | 9/2015 | | |
| DE | 102014216905 A1 | 3/2016 | | |
| EP | 2945260 A2 | 11/2015 | | |

* cited by examiner

CONNECTION OF A ROTOR SHAFT TO A LAMINATED CORE

The present invention relates to a rotor for an electric motor, having a rotor shaft and, mounted on the rotor shaft, a rotor core having a number of core laminations arranged along an axis of the rotor core.

Moreover, the present invention relates to an electric motor having a rotor.

BACKGROUND

Electric motors, in particular brushless electric motors, having a stator and a rotor rotating in the stator are widely known from the prior art. German patent application DE 102010031399 A1 shows for example a rotor according to the prior art.

A rotor for an electric motor customarily consists of a number of successively arranged core laminations for forming a so-called laminated core and of a rotor shaft which is positioned through a central opening in the laminated core. Here, the core laminations and the rotor shaft are connected to one another so as to be fixed against relative rotation. The connection usually occurs here by way of a radial press seat or press fit of the rotor shaft in the laminated core.

SUMMARY OF THE INVENTION

However, in the case of abrupt braking operations or high torque surges of the electric motor, the rotor shaft sometimes has to transmit high torsion loads to the laminated core. A radial press seat can lead to slipping under high torsion load peaks and when there are unfavorable tolerance pairings. This leads to a power reduction of the electric motor.

Moreover, many electric motors according to the prior art suffer from the problem that, in the case of a metallic press seat contact running around the envelope surface of the rotor shaft, magnetic field lines penetrate from the rotor laminations up to and into the rotor shaft. It is thereby possible as a result of axially running eddy currents for conduction losses to occur in the electric motor.

It is an object of the present invention to provide a rotor for an electric motor and also an electric motor whereby the aforementioned problem can be solved and power losses reduced.

The present disclosure provides a rotor for an electric motor, having a rotor shaft and, mounted on the rotor shaft, a rotor core having a number of core laminations arranged along an axis of the rotor core.

According to the invention, each core lamination comprises a central contoured aperture which is traversed by the rotor shaft and which comprises at least two radially extending elevations and at least two cutouts positioned between the elevations, wherein, to form a press fit of the core laminations on the rotor shaft, a distance between the free ends of the elevations is less than a diameter of the rotor shaft, and wherein a duct extending peripherally on the rotor shaft is formed by the respective cutout in the successively arranged core laminations.

By virtue of the cutouts, the press seat contact between rotor shaft and laminated core is multiply interrupted. In these interruptions, which can also be referred to as air pockets, the magnetic field lines of the core lamination toward the rotor shaft are screened off. The penetration of the magnetic field lines from the core laminations into the rotor shaft is reduced as a result. On the other hand, the cutouts and the thereby produced ducts between the core laminations and the rotor shaft mean that there exists the possibility of introducing liquid plastic between the core laminations and the rotor shaft and of thus creating a form-fitting and integrally bonded connection given a suitable counterpart contour in the rotor shaft.

It is possible here for the rotor to be provided for an electric motor of a power tool, in particular a hammer drill, a saw, a grinding device or the like.

According to one advantageous embodiment of the present invention, it can be possible that four cutouts positioned between the elevations are present, wherein the four cutouts are substantially each rotated through 90° with respect to one another along the axis. Furthermore, other combinations of angles and numbers of cutouts are also possible.

According to a further advantageous exemplary embodiment of the present invention, it can be possible that three cutouts positioned between the elevations are present, wherein the three cutouts are substantially each rotated through 120° with respect to one another along the axis.

According to a further advantageous exemplary embodiment of the present invention, it can be possible that the rotor shaft comprises at least one groove running spirally around an envelope surface. It is possible in a relatively simple manner by filling with plastic for the connection between the core laminations and the rotor shaft to be secured against relative rotation.

Furthermore, the present invention provides an electric motor having a rotor of the type and with the features stated at the outset.

It is possible here for the electric motor to be configured as a brushless electric motor.

BRIEF DESCRIPTION OF THE DRAWINGS

Further advantages can be found in the following description of the figures. Various exemplary embodiments of the present invention are illustrated in the figures. The figures, the description and the claims contain numerous features in combination. A person skilled in the art will expediently also consider the features individually and combine them into useful further combinations.

In the figures.

DETAILED DESCRIPTION

Figure 1:
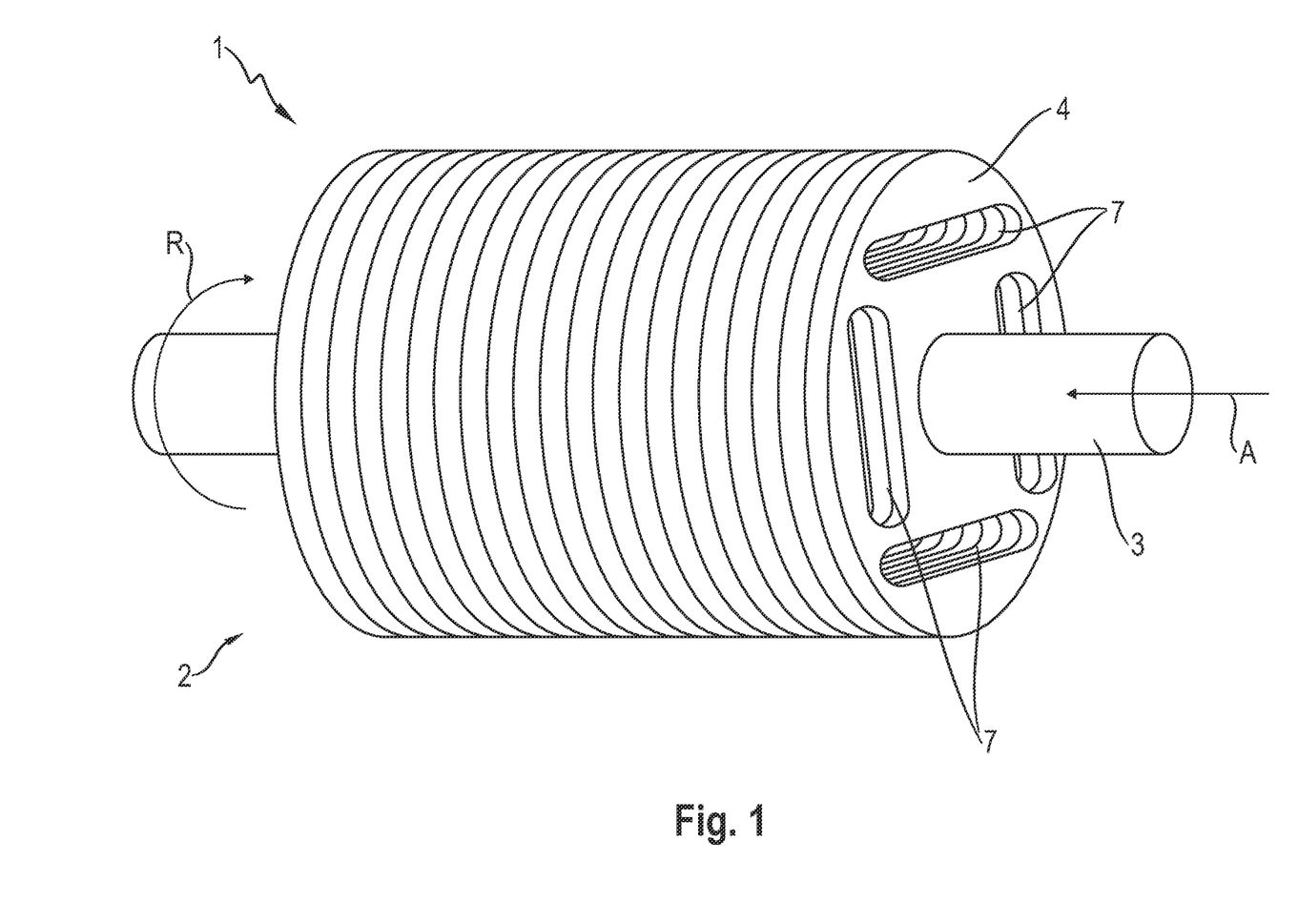
FIG. 1 shows a perspective view of a rotor having a number of core laminations and a rotor shaft.

FIG. 1 shows a schematic illustration of a rotor 1 according to the invention for an electric motor. The electric motor can in turn serve as a drive for generating a torque in a power tool. Here, the power tool can be configured as a drilling machine, hammer drill, saw, grinding device or the like. Neither the electric motor nor the power tool is illustrated in the figures.

Here, the rotor 1 substantially comprises a rotor laminated core 2 (also referred to only as a laminated core) and a rotor shaft 3.

As can be seen from FIG. 1, forming a cylindrical rotor laminated core 2 requires a plurality of core laminations 4 to be positioned in succession in arrow direction A.

The rotor shaft 3 is configured to be substantially cylindrical. The rotor shaft 3 has a uniform diameter D2 (cf. FIG. 2a).

Figure 2A:
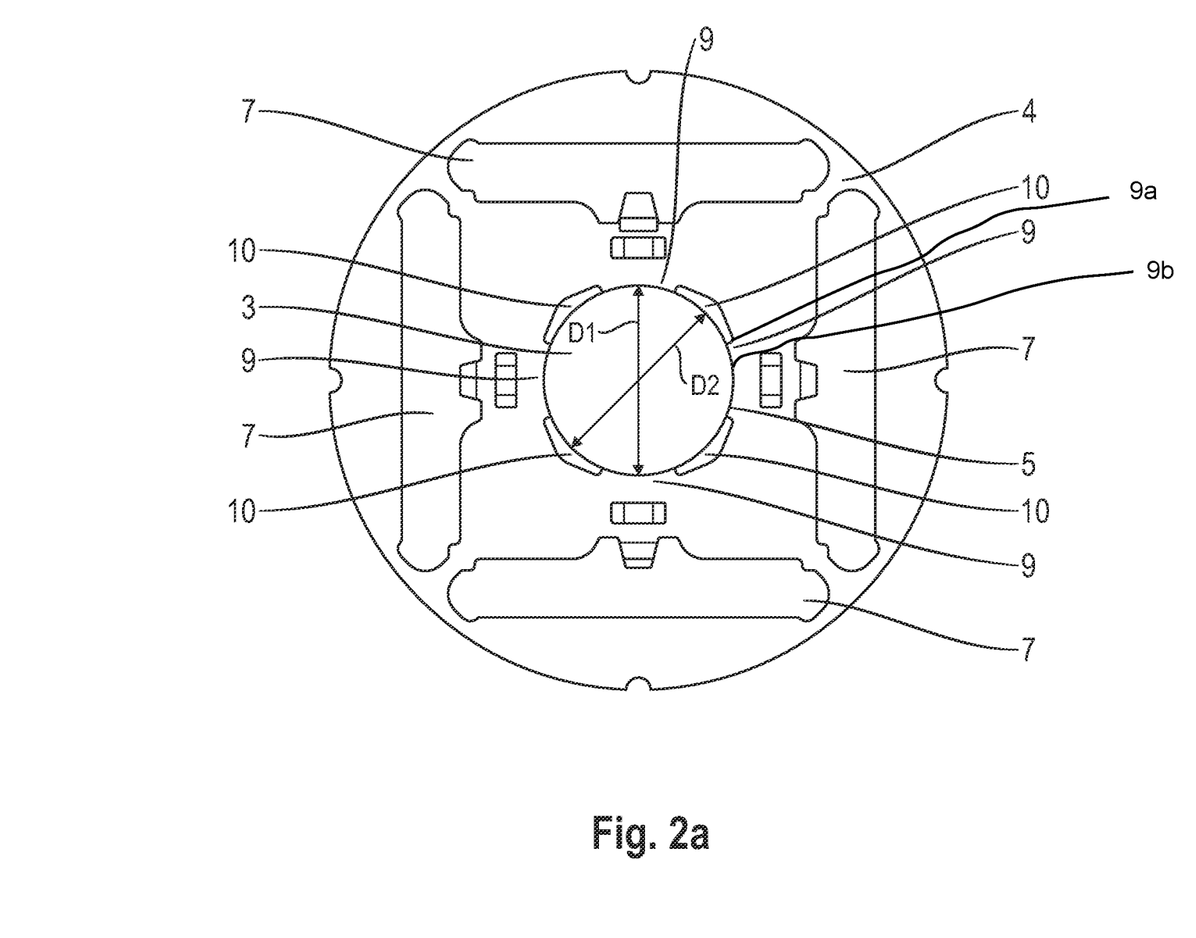
FIG. 2a shows a front view of the rotor with the rotor shaft and the core laminations according to a first embodiment.
Figure 2B:
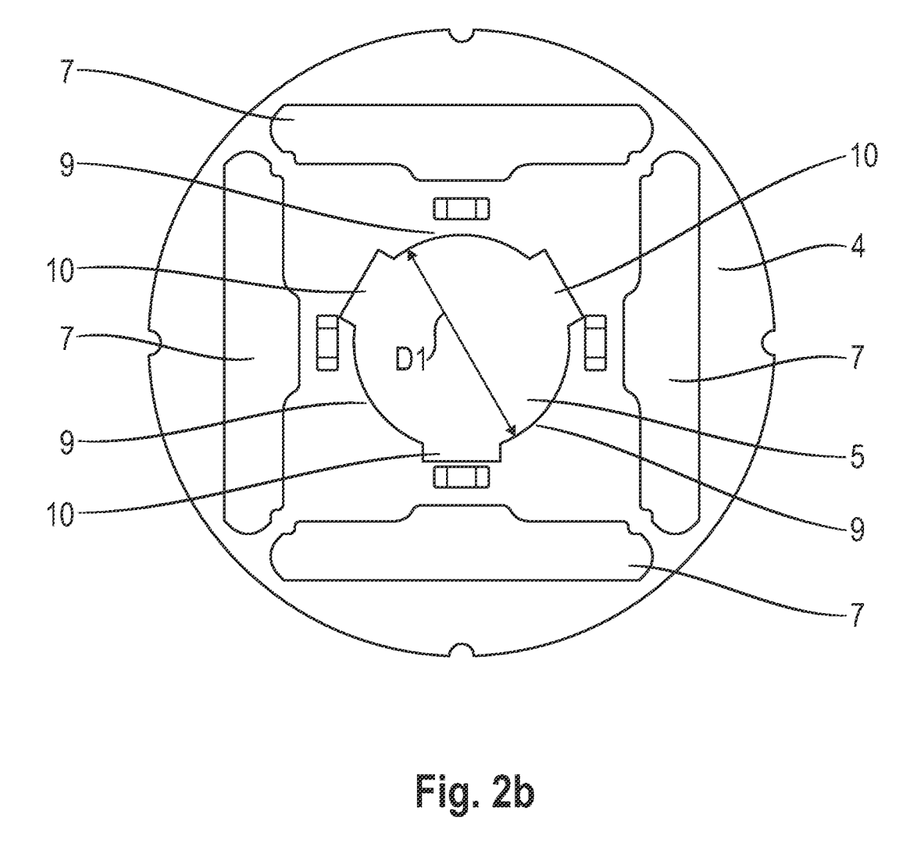
FIG. 2b shows a front view of a core lamination according to a second embodiment.

FIG. 2a shows a core lamination 4 according to a first embodiment, and FIG. 2b shows a core lamination 4 according to a second embodiment.

Figure 5:
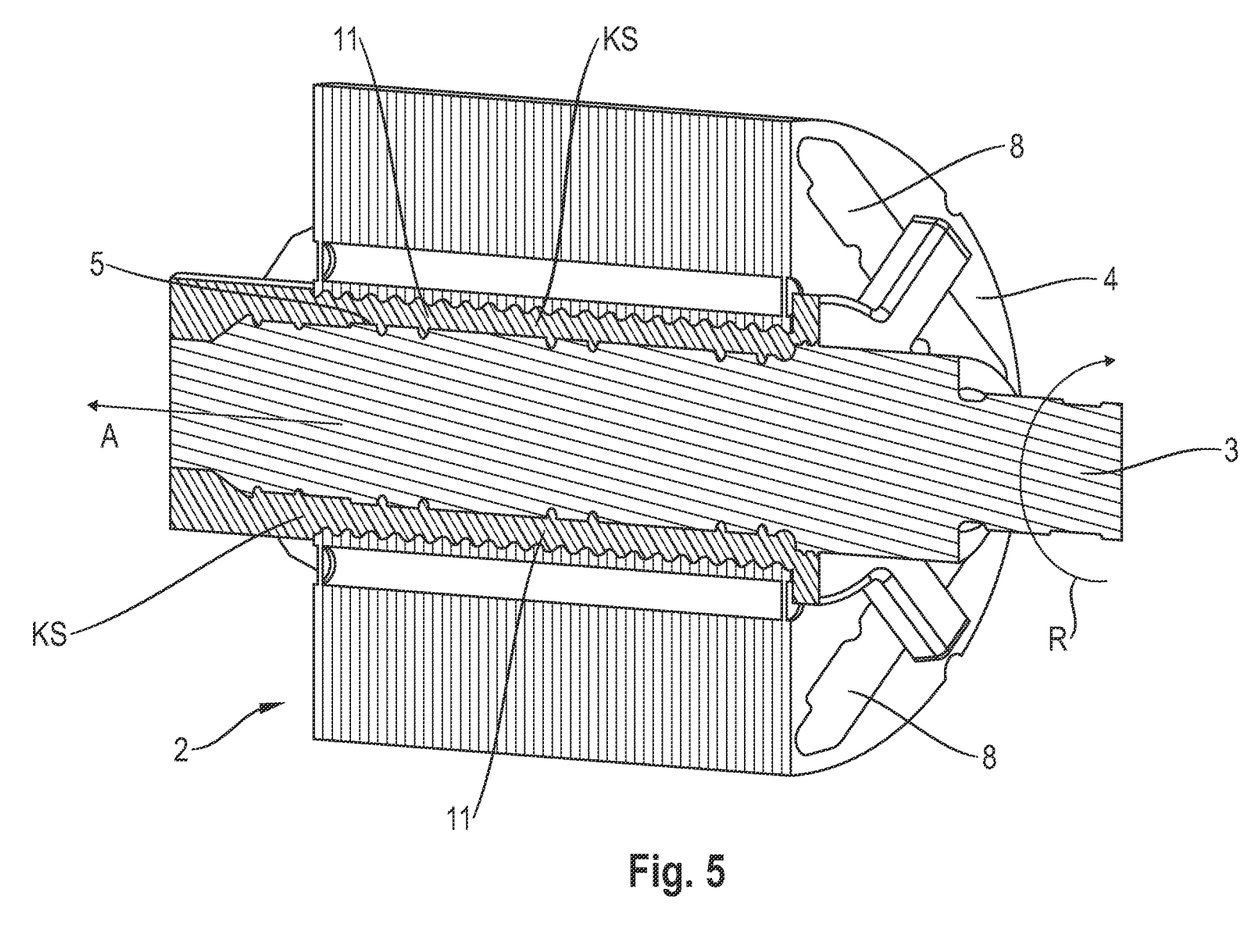
FIG. 5 shows a perspective sectional view through a rotor with plastic injected between the core laminations and the rotor shaft.

Each individual core lamination 4 substantially comprises a central aperture 5 and a plurality of cutouts 7. The core lamination 4 according to the first and second embodiment (cf. FIGS. 2a, 2b) comprises four cutouts 7 in each case. The four cutouts 7 are arranged in a circular shape around the central aperture 5 and each serve to receive a magnet 8. The magnets 8 can be permanent magnets. The magnets 8 are indicated in FIG. 5.

The core lamination 4 according to the first embodiment comprises a first, second, third and fourth elevation 9 around the central aperture 5, cf. FIG. 2a. The core lamination 4 according to the second embodiment comprises a first, second and third elevation 9 around the central aperture 5, cf. FIG. 2b. The elevation 9 can also be referred to as a web. Each elevation 9 here has a first end 9a and a second end 9b. The elevation 9 is positioned by the first end 9a on the inner circular envelope surface of the central aperture 5. The second end 9b of each elevation 9, which can also be referred to as free end 9b, extends in the radial direction toward the center of the central aperture 5 in the core lamination 4. Consequently, each elevation 9 also extends in the radial direction toward the center of the central aperture 5.

As can be seen from FIG. 2a for the core lamination according to the first embodiment, in each case two elevations 9 are positioned opposite one another around the central aperture 5. Here, the elevations 9 are positioned around the inner circular envelope surface of the central aperture 5 so as to be each rotated 90° with respect to one another.

As can be seen from FIG. 2b for the core lamination according to the second embodiment, three elevations are positioned radially around the central aperture. Here, the elevations are positioned around the inner circular envelope surface of the central aperture so as to be each rotated 120° with respect to one another.

As already mentioned above, the individual core laminations are positioned or arranged in succession in direction A in order to form the cylindrical rotor laminated core. The rotor shaft is pushed through the central aperture in the individual core laminations and positioned there, with the result that the rotor is formed.

Figure 3:
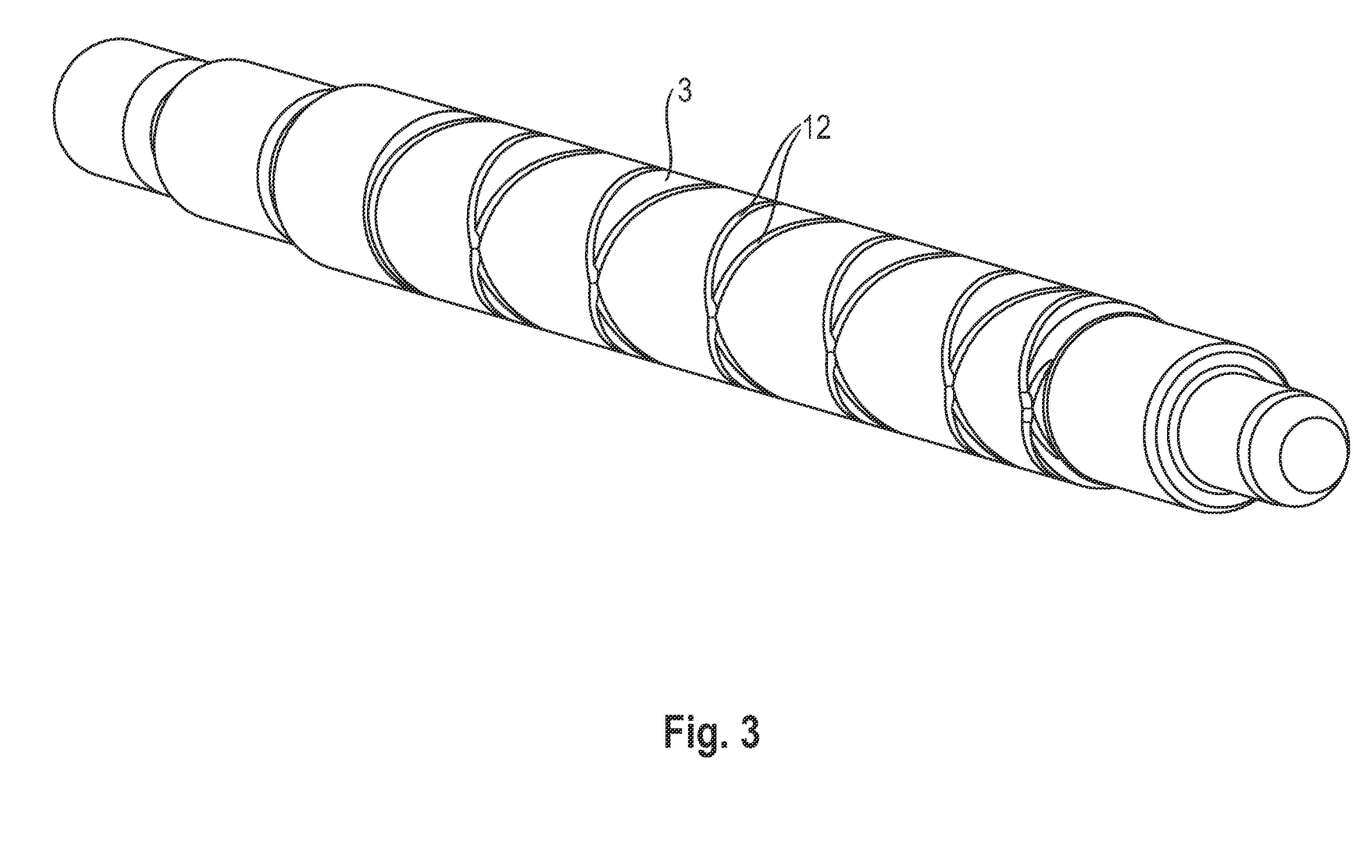
FIG. 3 shows a perspective view of a rotor shaft.
Figure 4:
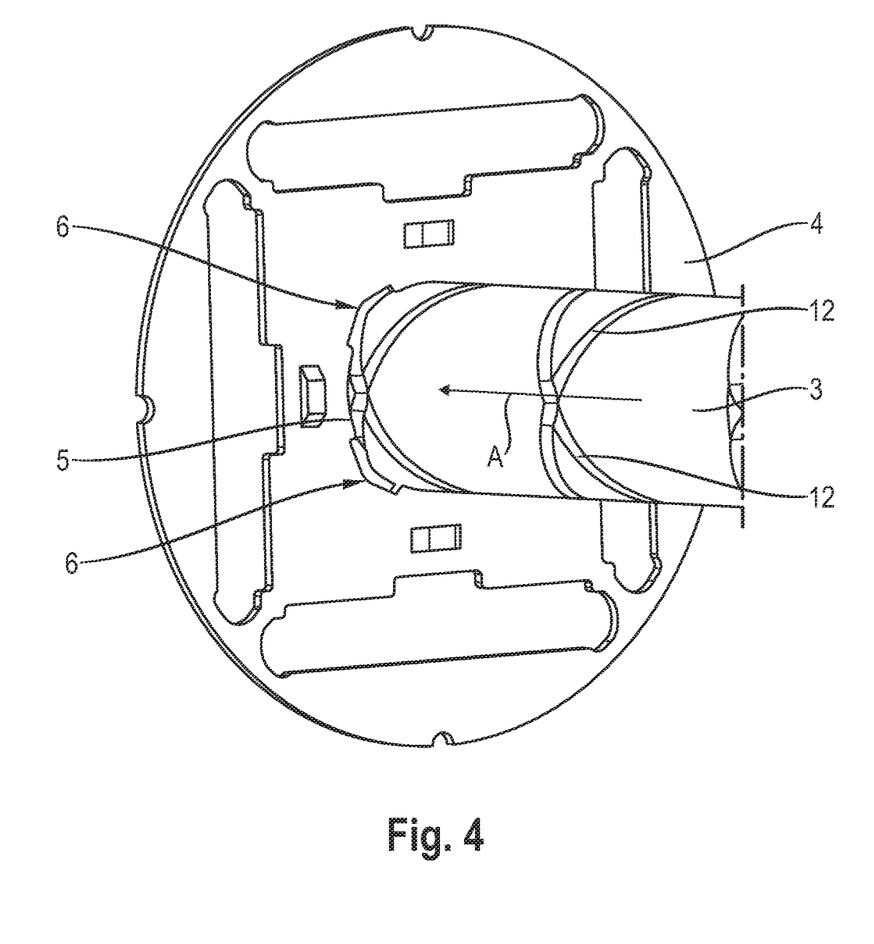
FIG. 4 shows a perspective view of an individual core lamination on the rotor shaft.

FIG. 3 illustrates the rotor shaft. As can be seen, two spiral depressions are provided on the envelope surface or on the surface. The depression can also be referred to as a groove. According to an alternative embodiment, the rotor shaft does not have spirally running depressions, but rather punctiform, circular, elongate or annular depressions.

The distance D1 or spacing between the second ends 9b of the elevations 9 is less here than the diameter D2 of the rotor shaft 3. The fact that the distance D1 between the second ends 9b of the elevations 9 is less than the diameter D2 of the rotor shaft 3 means that the rotor shaft 3 has to be pressed with a certain expenditure of force in direction A through the central aperture 5 in the core laminations 4. If the rotor shaft 3 has been positioned in the central aperture 5 in the core laminations 4, the elevations 9 are widened by a certain amount. The rotor shaft 3 is thus in a press seat or in a press contact with the core laminations 4. The thus created press contact makes it possible to prevent torsion of the rotor shaft 3 with respect to the core laminations 2.

According to an alternative embodiment of the present invention 9, it is also possible for more or fewer than three or four elevations 9 to be provided on the respective core lamination 4. If an even number of elevations 9 is selected, two elevations 9 are always in each case positioned or arranged opposite one another. Symmetry of the elevations 9 is strived for here.

As can also be seen from the figures, a cutout 10 is provided on each core lamination 4 between in each case two adjacent elevations 9.

In the case of the core lamination 4 according to the first embodiment, a first, second, third and fourth cutout 10 are present. Just like the elevations 9, the cutouts 10 are also positioned around the inner circular envelope surface of the central aperture 5 so as to be each rotated 90° with respect to one another. An elevation 9 and an adjacent cutout 10 are here arranged so as to be each rotated 45° with respect to one another.

In the case of the core lamination 4 according to the second embodiment, a first, second and third cutout 10 are present. Just like the elevations 9, the cutouts 10 are also positioned around the inner circular envelope surface of the central aperture 5 so as to be each rotated 120° with respect to one another.

By virtue of the fact that the core laminations 4 are positioned in succession in direction A to form a rotor laminated core 2 and the cutouts 7 in each core lamination 4 are likewise positioned in succession in direction A, uniformly distributed ducts 11 are formed in the cutouts 10 around the envelope surface of the rotor shaft 3. The ducts 11 are positioned here between the inner circular envelope surface of the central aperture 5 in the core laminations 4 and the outer envelope surface of the rotor shaft 3 and extend over the entire length of the rotor laminated core 2.

As can be gathered from FIG. 5, liquid plastic KS can be introduced into the respective ducts 11. The plastic KS used can be a thermoset plastic. A transfer molding method can be used to introduce the liquid plastic KS. The injected and finally cured plastic KS serves as a partially form-fitting and force-fitting connection between the core laminations 4 and the rotor shaft 3, with the result that a possible relative rotation between the rotor shaft 3 and the core laminations 4 can be reduced when the rotor 1 rotates in the direction of rotation R.

According to a further advantageous embodiment of the present invention, the rotor shaft 3 can also comprise a groove 12 running spirally around an envelope surface of the rotor shaft 3, cf. FIG. 3. The envelope surface of the rotor shaft 3 is breached by this groove, resulting in greater adhesion of the core laminations 4 on the rotor shaft. Moreover, the encircling groove 12 also serves to ensure that the liquid injected plastic KS better adheres between the core laminations 4 and rotor shaft 3.

This groove 12, in conjunction with the cutouts 10 in the laminated core 2, creates, as a result of filling with plastic KS, the function of a safeguard against relative rotation.

What is claimed is:

1. A rotor for an electric motor, the rotor comprising: a rotor shaft; and a rotor core mounted on the rotor shaft, the rotor core having a plurality of core laminations arranged along an axis of the rotor core, each of the plurality of core laminations including a central contoured aperture traversed by the rotor shaft and including at least two radially extending elevations and at least two cutouts positioned between the elevations, wherein, to form a press fit of the core laminations on the rotor shaft, a distance between free ends of the elevations is less than a diameter of the rotor shaft, and wherein a duct extending peripherally on the rotor shaft is formed by a respective one of the cutouts in the successively arranged core laminations, wherein an outer surface of the rotor shaft has at least one depression; and wherein the plurality of core laminations includes further cutouts arranged in a circular shape around the central aperture, each receiving a magnet.

2. The rotor as recited in claim 1 wherein the at least two cutouts include four cutouts positioned between the elevations, wherein the four cutouts are each rotated through 90° with respect to one another along the axis.

3. The rotor as recited in claim 1 wherein the at least two cutouts include three cutouts positioned between the elevations, wherein the three cutouts are each rotated through 120° with respect to one another along the axis.

4. The rotor as recited in claim 1 wherein the at least one depression includes at least one groove running spirally around the outer surface.

5. An electric motor comprising the rotor as recited in claim 1.

6. The rotor as recited claim 1 wherein the at least one depression includes two spiral depressions.

7. The rotor as recited in claim 1 wherein a number of further cutouts is four.

8. The rotor as recited in claim 4 wherein the at least one groove is filled with plastic for adherence between the core laminations and the rotor shaft.

9. A rotor for an electric motor, the rotor comprising: a rotor shaft; and a rotor core mounted on the rotor shaft, the rotor core having a plurality of core laminations arranged along an axis of the rotor core, each of the plurality of core laminations including a central contoured aperture traversed by the rotor shaft and including at least two radially extending elevations and at least two cutouts positioned between the elevations, wherein, to form a press fit of the core laminations on the rotor shaft, a distance between free ends of the elevations is less than a diameter of the rotor shaft, and wherein a duct extending peripherally on the rotor shaft is formed by a respective one of the cutouts in the successively arranged core laminations, and a thermoset plastic filling the at least two cutouts; and wherein the plurality of core laminations includes further cutouts arranged in a circular shape around the central aperture, each receiving a magnet.

10. The rotor as recited in claim 9 wherein the at least two cutouts include four cutouts positioned between the elevations, wherein the four cutouts are each rotated through 90° with respect to one another along the axis.

11. The rotor as recited in claim 9 wherein the at least two cutouts include three cutouts positioned between the elevations, wherein the three cutouts are each rotated through 120° with respect to one another along the axis.

12. The rotor as recited in claim 9 wherein the rotor shaft has an outer surface with at least one depression.

13. The rotor as recited in claim 12 wherein the at least one depression is filled with the thermoset plastic.

14. The rotor recited in claim 9 wherein the thermoset plastic connects the core laminations and the rotor shaft to reduce relative rotation between the rotor shaft and the core laminations.

15. An electric motor comprising the rotor as recited in claim 9.

* * * * *